(12) United States Patent
Schmatz

(10) Patent No.: US 6,425,693 B2
(45) Date of Patent: Jul. 30, 2002

(54) OPTICAL FIBER CONNECTOR

(75) Inventor: Martin Schmatz, Brugg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/681,625

(22) Filed: May 11, 2001

(30) Foreign Application Priority Data

May 25, 2000 (EP) .............................................. 00111218

(51) Int. Cl.[7] ................................................. G02B 6/38
(52) U.S. Cl. .............................. 385/59; 385/63; 385/90
(58) Field of Search ............................. 385/59, 60, 63, 385/71, 72, 86, 90, 91

(56) References Cited

U.S. PATENT DOCUMENTS

| | | | | |
|---|---|---|---|---|
| 4,029,390 A | * | 6/1977 | Chinnock et al. | 156/158 |
| 4,657,341 A | * | 4/1987 | Sammueller | 385/59 |
| 4,741,590 A | * | 5/1988 | Caron | 385/60 |
| 4,759,600 A | * | 7/1988 | Caron et al. | 385/72 |
| 5,109,453 A | * | 4/1992 | Edwards et al. | 250/227.11 |
| 5,214,730 A | * | 5/1993 | Nagasawa et al. | 385/59 |
| 5,602,951 A | | 2/1997 | Shiota et al. | 385/81 |
| 5,721,798 A | * | 2/1998 | Kanda et al. | 385/58 |
| 6,095,695 A | * | 8/2000 | Ohtsuka et al. | 385/134 |
| 6,293,708 B1 | * | 9/2001 | Ohtsuka et al. | 385/62 |

OTHER PUBLICATIONS

M. Kobayashi et al. "Injection Molded Plastic Multifiber Connector Realizing Physical Contact with Fiber Elasticity", Lee Journal Of Selected Topics In Quantum Electronics, vol. 5, No. 5, Sep./Oct. 1999, pp. 1271–1277.

* cited by examiner

Primary Examiner—Tulsidas Patel
(74) Attorney, Agent, or Firm—Derek S. Jennings

(57) ABSTRACT

An optical connector includes a plug unit and a counter plug unit, each comprise of two components. Each component comprises a receiving portion for receiving and fixing at least two optical fibers and an adjusting portion having adjusters to adjust the optical fibers in a defined position. The adjusting portion provides for the insertion of a connector by having elongate V-shaped grooves, with one of the optical fibers being aligned in each of the grooves by the adjusting portion.

27 Claims, 4 Drawing Sheets

OPTICAL FIBER CONNECTOR

BACKGROUND OF INVENTION

1. Field of the Invention

The present invention relates to an optical fiber connector having a plug unit and a counter plug unit, as well to a method of producing same.

2. Background of the Invention

In fiber-optical transmission technology optical fiber cables are used in the form of glass fiber cables for transmitting information. In this manner low-interference glass fibers permit the implementation of transmission channels having very large bandwidths and very high transmission capacities of more than 100 megabit/sec over rather long distances. Electro-optical or opto-electronic converters on both ends of the fiber-optical light guide convert analog signals or digital signals into light variations or pulses, and vice versa. The application of optical glass fiber cables requires, however, also joining techniques which permit a loss-free transmission of optical information to the respective electronic terminals. Moreover, the demand for high transmission capacities leads to glass fiber cables which are laid in parallel and linked with the respective terminals for further connection via specifically designed connector modules which are frequently provided in the form of plug units. Such optical parallel plugs can be assumed to replace the conventional electrical parallel pin-and-socket connectors in almost all applications in the future.

By contrast to conventional electrical parallel pin-and-socket connectors, which serve to establish an ohmic contact between the individual electrode plug pins, it is necessary in optical connectors to position a plurality of glass fibers in a precise three-dimensional arrangement so as to achieve a loss-free coupling between the terminal sections of two immediately optical fibers as far as this is possible. The objective in optical connectors is the establishment of a narrow mutual contact between the face-cut ends of the optical fibers such that the optical transition of information from one glass fiber to the other will take place with a maximum of freedom from loss. Such a mechanical coupling particularly for a plurality of pairs of optical fibers opposing each other within a plug-in connection requires, however, high mechanical demands on the mechanism for positioning each optical fiber, so that in view of the required high precision as well as the mechanical and thermal stability such plug connectors incur high manufacturing costs.

In this respect the U.S. Pat. No. 5,602,951 discloses a clamping contact plug consisting of an upper and a lower part, with the terminal sections of optical fibers to be contacted with each other being provided for insertion therebetween for a precise positional orientation of the pairs of optical fibers which are to be contacted with each other by their respective glass fiber ends. V-shaped grooves are provided in the lower part of the clamping plug, into which the individual optical fibers can be inserted in parallel side-by-side arrangement. The positioning grooves in the lower part of the clamping plug must satisfy extremely high demands in terms of their geometric arrangement and configuration for positioning the optical fiber ends, which are to be contacted with each other in a rigid manner, relative to each other most accurately by joining the respective abutting faces. This requires, however, a maximum of precision, which involves substantial manufacturing costs. Furthermore, the known plug system merely permits the coupling of eight parallel pairs of optical fibers. In view of the prevailing demands in terms of precision, however, an increase of the number of optical fiber pairs to be contacted with each other would result in a multiplication of the manufacturing costs.

The article by N. Kobayashi et. al. "Injection Molded Plastic Multifiber Connector Realizing Physical Contact with Fiber Elasticity", in IEEE Journal of Selected Topics in Quantum Electronics, Vol. 5, No. 5, September/October 1999, pp. 1271–1277, discloses an optical fiber plug system in which the optical fibers to be contacted with each other run into respective plug units of an identical design, with the ends of the optical fibers ending in an unsupported section within the plug units. Moreover, an intermediate adapter element is provided which presents through-bores into which the optical fibers with their unsupported ends respectively run from opposite sides so that they abut each other in pairs within the bores. With the optical fibers running into the bores with some excessive length their length is slightly upset by the plug unit so that their optical fiber ends are pressed against each other by the additional resilience along the upset glass fibers. The disadvantage of this plug solution is the high risk of fracture of each optical fiber with its unsupported ends during the operation of joining it with the intermediate adapter unit. Apart therefrom, such a plug solution cannot be optionally scaled for a major number of optical fibers to be contacted.

The present invention is therefore based on the problem of configuring a plug for optical fibers in such a way that the optical fibers to be contacted with each other can be reliably and precisely optically coupled relative to each other while the plug should be suitable for manufacture at the lowest cost possible and is capable of satisfying maximum demands on positional adjustment of each optical fiber. Furthermore, the plug should preclude any risk of damage to the optical fibers both in the plug-in and the plug-out operations. The plug should moreover offer the possibility of connecting an optional number of optical fibers with each other at a high component density, which are disposed in a linear or array arrangement.

SUMMARY OF THE INVENTION

The object of the invention is achieved with an optical fiber connector and a method as set forth in the appended claims.

A feature of the present invention includes an optical fiber connector having a plug unit and a counter plug unit, wherein the plug unit and the counter plug unit each comprise two components, each having a receiving portion for receiving and fixing at least two optical fibers and an adjusting portion having adjusters to adjust the optical fibers in a defined position, and wherein at least the adjusting portion provides for the insertion of a connector having at least two elongate V-shaped grooves, with one of the optical fibers being aligned by the adjusting portion in each of the grooves.

Another feature of the present invention includes a method of producing an optical fiber connector having a plug unit and a counter plug unit, wherein the plug unit and the counter plug unit each comprise two components, each having a receiving portion for receiving and fixing at least two optical fibers and an adjusting portion having adjusters to adjust the optical fibers in a defined position, and wherein at least the adjusting portion provides for the insertion of a connector having at least two elongate V-shaped grooves, with one of the optical fibers being aligned by the adjusting portion in each of the grooves, comprising the steps of: inserting said optical fibers into each separate component by inserting each of said optical fibers into said grooves of said receiving portion and into said groove of said adjusting portion such that the end of each inserted optical fiber extends beyond a seating surface of said adjusting portion; fixing each of said inserted optical fibers in said groove of said receiving portion; combining said two components facing each other with their optical fibers inserted into said groove; and polishing said seating surface together with the ends of said optical fibers which partially extend into said combined components.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

The invention will now be described in detail below with reference to the drawings.

DETAILED DESCRIPTION

Figure 1:
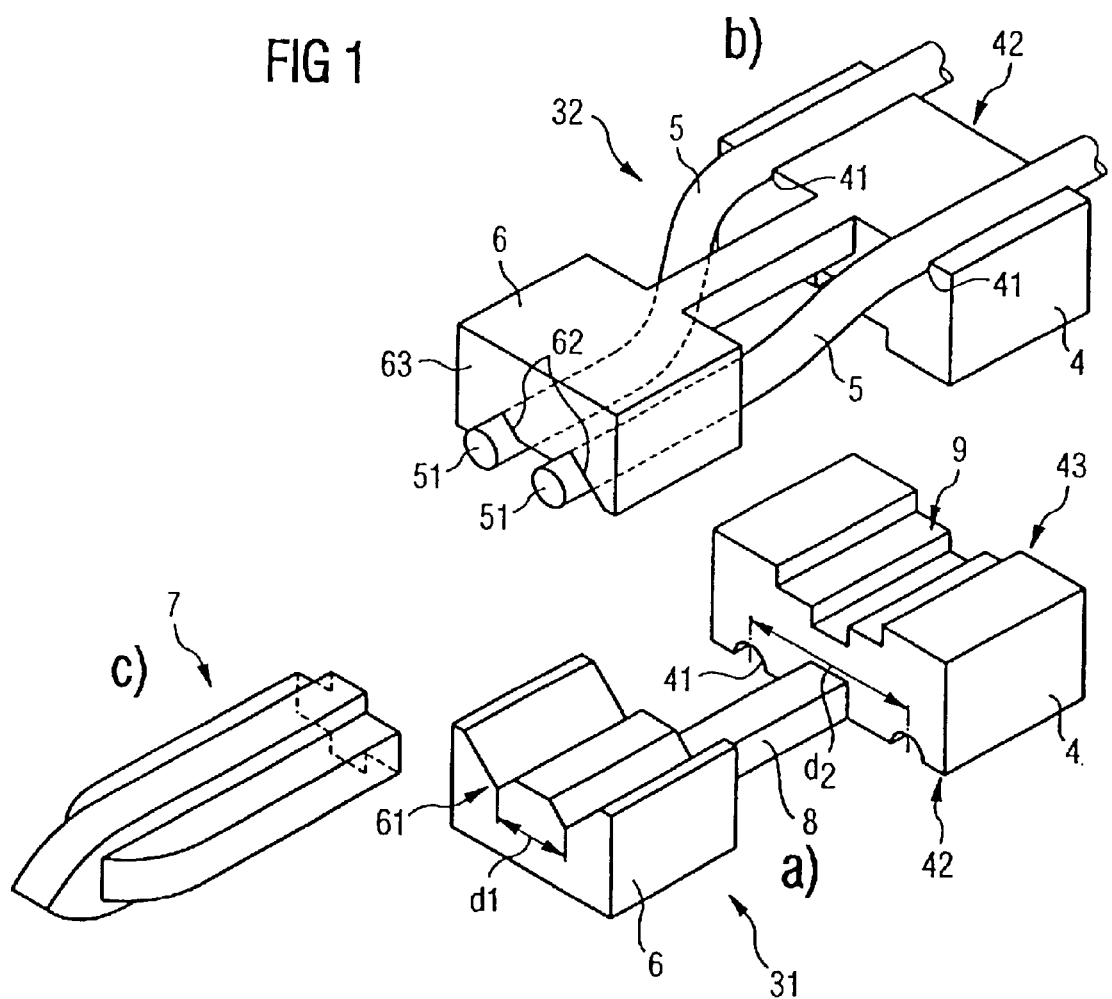
FIGS. 1A 1C are perspective views of the individual components for the assembly of a plug and counter plug unit.

The inventive optical fiber connector for optical fibers comprises a plug unit and a counter plug unit, with the plug unit and the counter plug unit consisting each of two identical components which can be preferably made of a synthetic material and obtained by a simple injection molding process. Each component is so designed that it can receive at least, however preferably, two optical fibers. To this end each component provides a support portion which receives the optical fibers at a spacing from their fiber ends, for instance within two V-shaped grooves in which the optical fibers can be fixed, for instance by means of an adhesive. The support portion is connected to an adjusting portion via joint means, with the optical fiber ends slightly projecting beyond this adjusting portion. The adjusting portion comprises adjusting means in the form of suitable lateral edges along which the optical fibers extend and by which the fibers are spatially, i.e. three-dimensionally, positioned and adjusted.

Two components each, which are assembled with the optical fibers, are so joined that those fibers which are located in the adjusting means of the respective components are arranged in direct opposition. Both components are fixed relative to each other by their support portions whilst the adjusting portions of the components are loosely pressed against each other via their optical fibers. The plug unit is separated from the counter plug unit by an additional connector which is pushed between the two components through an appropriate recess provided in the components and projects beyond the adjusting portion inclusive of the optical fibers projecting there beyond.

The connector is configured in the manner of an extruded section having a cruciform cross-section and four circularly arranged rectangles or V-shaped grooves symmetrical relative to its longitudinal axis, with the four optical fibers inserted into the two components loosely running into the groove courses. The plug unit, which is completed by the elongate connector, is inserted for coupling into the counter plug unit into which four optical fibers are equally introduced. The plug unit and the counter plug unit are inserted in such a way that the part of the elongate connector which projects beyond the adjusting portion is introduced between the four optical fibers of the counter plug unit until the adjusting portions of the plug unit and the counter plug unit contact each other directly via their seating means, or are very close to each other.

With the optical fibers of the plug unit and the counter plug unit projecting beyond the seating surfaces of the adjusting portions of the respective component in the separate condition, the fiber ends of the optical fibers opposing each other in the rectangular or V-shaped groove of the connector are downright pressed against each other during the inserting assembly of the plug and the counter plug. In the joined condition the optical fibers are thus upset along their extension against their fixing in the support portion, with a resulting lateral deformation along the joint means and with the creation of a spring force capable of pressing them against each other.

Moreover, the optical fibers are uniformly pressed against the groove flanks of the elongate connector by the adjusting means of the adjusting portions such that the optical fibers will be precisely positioned relative to the elongate connector.

A particular advantage of the inventive plug principle resides in the configuration of the joint means which connect the support portion to the adjusting portion of each component. The joint means comprises a high longitudinal stiffness but it is yet flexible with respect to torsional movements. As a consequence, the insertion of the connector between the joined pairs of components may cause a deflection of the adjusting portions from their initial position relative to the respective support portions. Due to the deflection of the adjusting portions relative to the fixedly interconnected support portions the deformation of the respective joint means creates a restoring force by means of which the optical fibers are pressed respectively symmetrically into the longitudinal grooves of the connector by the adjusting means of the adjusting portions. By appropriate shaping of the adjusting means in the form of groove flanks having a V-shaped design the optical fibers are also fixed symmetrically in the longitudinal grooves of the connector even when the joining assembly of both components to form a single plug unit presents some inaccuracies as a result of manufacturing tolerances or insufficient precision in the mutual alignment.

In this manner it is possible to couple optical fibers optically with each other with extreme precision even though a high precision in the sub-micrometer range is not demanded in the manufacture of the components required for the plug unit. As a result of the self-adjustment in the event of possibly occurring variations from an ideal joining assembly of the optical fibers with the respective components, which is due to the design, it is yet possible to ensure that the optical fibers to be interconnected can be spatially fixed relative to each other and optically coupled with each other with extreme precision.

The inventive plug system for optical fibers moreover offers the opportunity to arrange a plurality of the afore-described pairs of optical fibers, which are integrated into the respective components, in a lateral side-by-side relationship as well as in a stacked arrangement. Initial considerations in view of a maximum packing density to be achieved with two-dimensional fiber arrays to be optically contacted with each other start out from more than 1,000 optical fibers which are arranged in an array lay-out on an area of 2.5×10 centimeters and which can be optically contacted with self-alignment with a matching counter plug unit by means of the inventive plug system. On the condition that a data flow of 10 Giga bits/second is transmitted per optical fiber this means that the overall transmission bandwidth of the plug connector system corresponds to more than 10 Tera bits/second over a plug cross-section of 25 cm².

It is, of course, possible to increase the number of optical fibers to be integrated per component and to use an extruded section with a star-shaped cross-section as connector, which provides more than four guiding grooves for the insertion of individual optical fibers, in variation from the example of an extruded section having a cruciform cross-section.

Apart from the self-adjusting mechanism which positions the optical fibers individually and separately from each other in the guiding grooves of the connector with a high fitting precision and in symmetrical arrangement, the manufacture and the assembly of the plug system play a decisive role. As has been mentioned above already, the components, which are of an identical design for both the plug unit and the counter plug unit, can be produced in a conventional injection molding process. Such a process does not involve demands on tolerance of the individual components in the sub-micrometer range. Mass production of these identical components permits a low-cost manufacture. The same applies to the production of the connector which has preferably a cruciform cross-section and which can be manufactured as injection molded or extruded part.

In a second step, the optical fibers are integrated into the individual components by connecting them, on the one hand, fixedly to the support portion of the component, for instance by local adhesive bonding, and, on the other hand, by the provision that their fiber ends project beyond the seating surface of the adjusting portion slightly, i.e. by roughly one millimeter or less. Further demands need not be made on the quality of the fiber ends with respect to their planarity.

In a further step, the components provided with the optical fibers are joined in pairs each. In this step the fiber ends project beyond the respective seating surfaces of the adjusting portions.

In another step of operation the ends of the optical fibers are polished. In this operation, the plug unit with its seating surface is pressed against a polishing surface in such a way that the optical fibers yield into the plug unit until the ends of the optical fibers are flush with the seating surface of the adjusting portion. With a selective removal of material on the ends of the optical fibers and on the material of the component as such, from which usually a greater quantity of material is removed during the surface finishing than from the ends of the optical fibers, it is possible to achieve a precise geometric adaptation of the projection of the ends of the optical fibers beyond the seating surface of the adjusting portion, in addition to the surface finishing of the ends of the optical fibers. Subsequently to the completion of the polishing operation and upon elimination of the polishing pressure the ends of the optical fibers typically project beyond the seating side of the adjusting portion by a few 100 mm. It is this projection which ensures that when the plug unit and the counter plug unit are assembled by fitting them into each other the ends of the optical fibers opposing each other in the guiding grooves of the connector are optically coupled to each other with a defined contact pressure.

FIGS. 1A 1C show perspective views of the individual components for the assembly of a plug and counter plug unit designed in accordance with the present invention.

The plug or counter plug unit fundamentally comprises two different components, i.e. the identically configured components 31 and 32, as well as the connector 7 which has a cruciform cross-section in the illustration in FIG. 1C. All the components can be produced by a conventional injection molding process and are preferably made of a synthetic resin. The components 31, 32 consist substantially of three sections, a support portion 4, a joint 8 and an adjusting portion 6. The support portion 4 of the components 31, 32 includes two opposite sides 42 and 43, with two parallel grooves 41 being machined in the side 42. The grooves serve to guide and insert aL respective optical fiber 5 and may be configured as round or V-shaped grooves. The side 43 of the support portion 4, which is opposite to the side 42, presents a recess 9 corresponding to half the cross-sectional area of the connector 7. The joint 8 joins the side 42 immediately and extends via a face of the support portion 4 towards the adjusting portion 6 opposing the support portion 4. The joint 8 is designed so that the adjusting portion 6 can be laterally as well as torsionally pivoted relative to the support portion 4, but it presents yet a certain basic stiffness.

The adjusting portion 6 comprises adjusters 61 which are designed as V-shaped grooves 62 and are located on a side of the adjusting portion 6, which is turned away from the side 42 of the support portion 4. As with the adjusters 61 any element that provides for a mechanical adjustment or alignment of the fibers 5 in a predefined position is suitable, in particular grooves of any suitable shape, or protrusive elements or adhesive elements that fulfill the adjusting function.

One aspect, which will still be discussed herein below, relates to the spacing $d_1$ of the V-shaped grooves 62 in the adjusting portion 6, which is so dimensioned that it is smaller than the spacing $d_2$ of the grooves 41 in the support portion 4.

For the assembly of a plug or counter plug unit the components 31 and 32, illustrated in FIGS. 1A and 1B, must each be equipped with two optical fibers 5. This is done in the manner shown in FIG. 1B by placing one optical fiber 5 each into the groove 41 of the support portion 4 and by joining it there fixedly to the support portion 4, for instance by means of an adhesive. The further course of the optical fiber 5 up to the end 51 of the optical fiber extends through the V-shaped grooves 62 of the adjusting portions 6. In this operation the optical fibers 5 must be inclined each from the plane of the side 42 of the support portion 4 to extend vertically downwards and laterally in a direction towards the joint 8, whereupon they rest loosely in the grooves 62. The ends of the fibers project beyond the seating surface 63 of the adjusting portion 6 by a few 100 μm. The seating surface 63 is the surface at which the plug unit 1 is supposed to meet with the counter plug unit 2. Even though on account of the relative arrangement of the grooves 41 and 62 the fibers 5 which are fixedly joined on one side extend loosely in the grooves 62 they are downright biased into the course of the groove 62 due to their intrinsic bending.

Now two components (31, 32), which are equipped with the respective pairs of fibers are stacked in such a manner that the adjusting portions are directly opposite by the sides of their adjusters 61 and the fibers 5 located therein. The support portions 4 are then fixedly joined with each other by means of mechanical clamping or an adhesive technique while at the same time they close a bushing channel 10 which is composed of the recesses 9 of the individual components 31 and 32. As will be further described in the following, the bushing channel 10 serves for the introduction of the connector 7.

Figure 2:
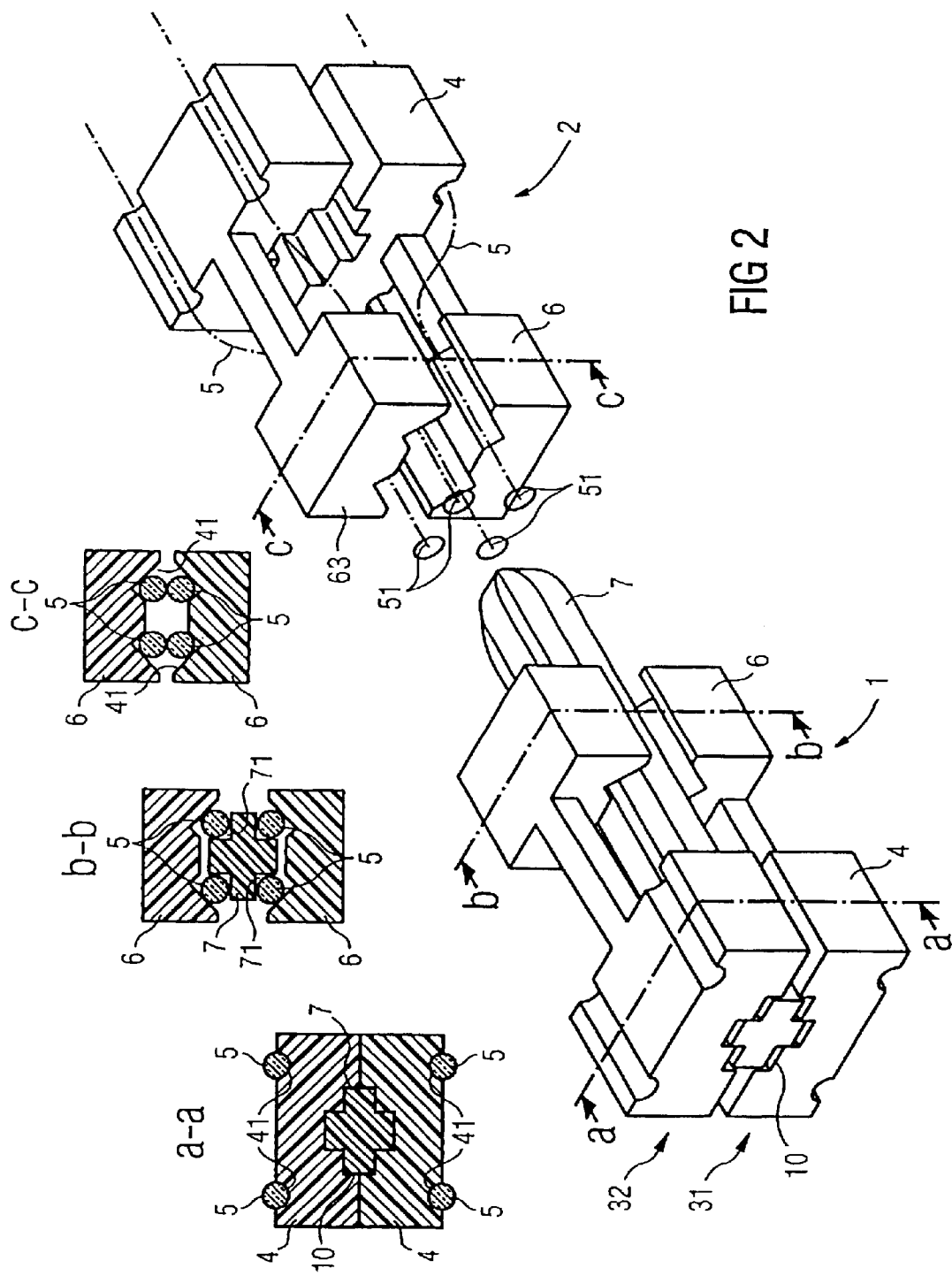
FIG. 2 is a perspective overall view to illustrate the plug/counter plug principle.

FIG. 2 illustrates a plug unit 1 as well as a counter plug unit 2 in a perspective view. For reasons of a better illustration the components 31 and 32 and the respective plug and counter plug units 1 and 2 are shown at a slight spacing from each other. In the counter plug unit 2 only the runs of the optical fibers 5 within the counter plug unit are illustrated for the sake of a clearer view.

The connector 7 projects from the plug unit 1 in a direction towards the counter plug unit 2, which is inserted between the components 31 and 32 of the plug unit through the bushing channel 10 from the side of the support portion 4. In the appropriately joined condition of the components 31 and 32 the connector 7 is fixedly connected to the support portions 4 of the two components 31 and 32. For the sake of a clearer view the representation of the optical fibers within the plug unit 1 has been dispensed with. In both cases, i.e. in the case of the plug unit 1 and the case of the counter plug unit 2, the fiber ends 51 of the optical fibers project beyond the seating surfaces 63 of the respective adjusting portions 6.

The detail illustrations according to FIGS. 2A–2C show cross-sectional views taken along the sectional lines indicated in FIG. 2. In correspondence with the illustration in FIG. 2A, the optical fibers 5 are located in the respective grooves 41 of the support portions 4. The connector 7 is inserted into the bushing channel 10. The individual fibers 5 are fixedly joined with the courses of the grooves 41, for example by means of adhesives.

In FIG. 2B, the cross-section taken through the adjusting portions 6 is illustrated between which the respective optical fibers 5 as well as the connector 7 is inserted. The individual optical fibers 5 are pressed symmetrically into the longitudinal groove 71 of the connector 7 by means of the respective outside groove flank. Thus all the optical fibers 5 are unambiguously positioned in a position defined by the longitudinal groove 71. Even a tilted placement of the adjusting portions 6 on the optical fibers inserted into the connector 7 results in automatic self-adjustment to the effect that all four optical fibers are almost automatically pressed into the guiding grooves 71 defined by the connector 7.

The detail view according to FIG. 2C shows a cross-section taken through the adjusting portion 6 of the counter plug unit 2 into which the connector 7 has not yet been inserted. It is apparent that when the support portions 4 of the components 31 and 32 are fixedly joined with each other the respective adjusting portions 6 thereof are spaced from each other by the optical fibers 5. The optical fibers 5 are symmetrically disposed within the V-shaped grooves 41 and contact each other in paired opposition in a single point. A comparison of the cross-section view according to FIG. 2C against the illustration in FIG. 2B reveals that in the case of the plug connector system 1 with inserted connector the individual optical fibers 5 are displaced by the connector 7 from their symmetrical position relative to the groove 62 (as is illustrated in FIG. 2C) and enter into contact with the adjusting portion 6 merely by one contact point via the respective outside groove flank of the groove 62. This produces, however, the effect that the adjusting portion 6 positions the individual optical fibers symmetrically in the guiding grooves 71 of the connector 7 by means of its corresponding groove flanks.

Figure 3:
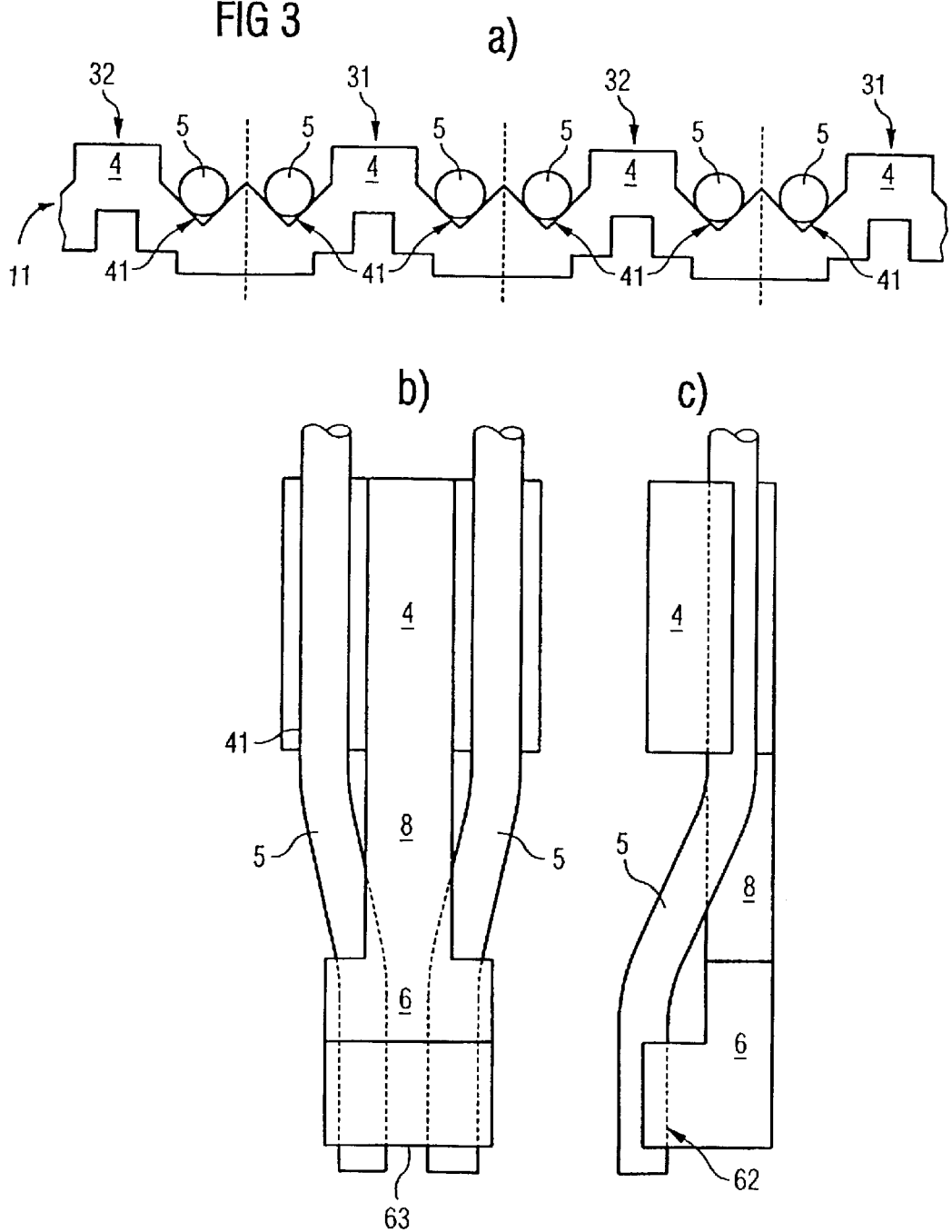
FIGS. 3A 3C show separate views illustrating the extension of the optical fibers in the component as well as the configuration of the component for an array-type arrangement of the fibers.

FIG. 3A shows a cross-section taken through a linear multiple structure 11 composed of immediately adjacent components 31, 32 which are integrally connected to each other and can be produced by a single injection molding process. The multiple structure 11 is composed of individual components 31, 32 which are disposed in a side-by-side arrangement. The cross-sectional view shows a section taken through the support portions of the individual components including optical fibers inserted into the individual grooves 41 thereof.

FIG. 3B is the plan view of a single component 31 which is provided with the support portion 4, the joint 8 as well as the adjusting portion 6. Moreover, the run of the optical fibers 5 is represented. What is clearly apparent is the fact that after their appropriate fixing in the groove 41 of the support portion 4 the optical fibers 5 project beyond the seating surface 63. FIG. 3C illustrates a corresponding side view appertaining to the illustration in FIG. 3B. In this case, too, the run of the optical fiber 5 with its characteristic bend is illustrated. Furthermore, the optical fiber with its fiber thickness exceeds the depth of the V-shaped groove 62 in the adjusting portion 6 by a small projection. When two corresponding components 31, 32 have been joined with insertion of the optical fibers 5 in correspondence with the illustration in FIG. 2C this projection, by which the fiber 5 projects beyond the V-shaped groove 62, produces the effect that the opposing adjusting portions 6 are slightly pushed away from each other. As a result a corresponding restoring force is created by which the pairs of fibers 5 are pressed against each other in correspondence with the illustration in FIG. 2C.

In the same manner in which a lateral multiple system may be composed of individual components 31, 32 for realizing a linear multiple array of optical fibers in a mating connector strip, it is also possible to stack them also in vertical arrangement for forming the multiple structure illustrated in FIG. 3A so as to form an array-type connector system which permits the positioning of up to 120 individual optical fibers on an area of 1 cm$^2$.

Figure 4:
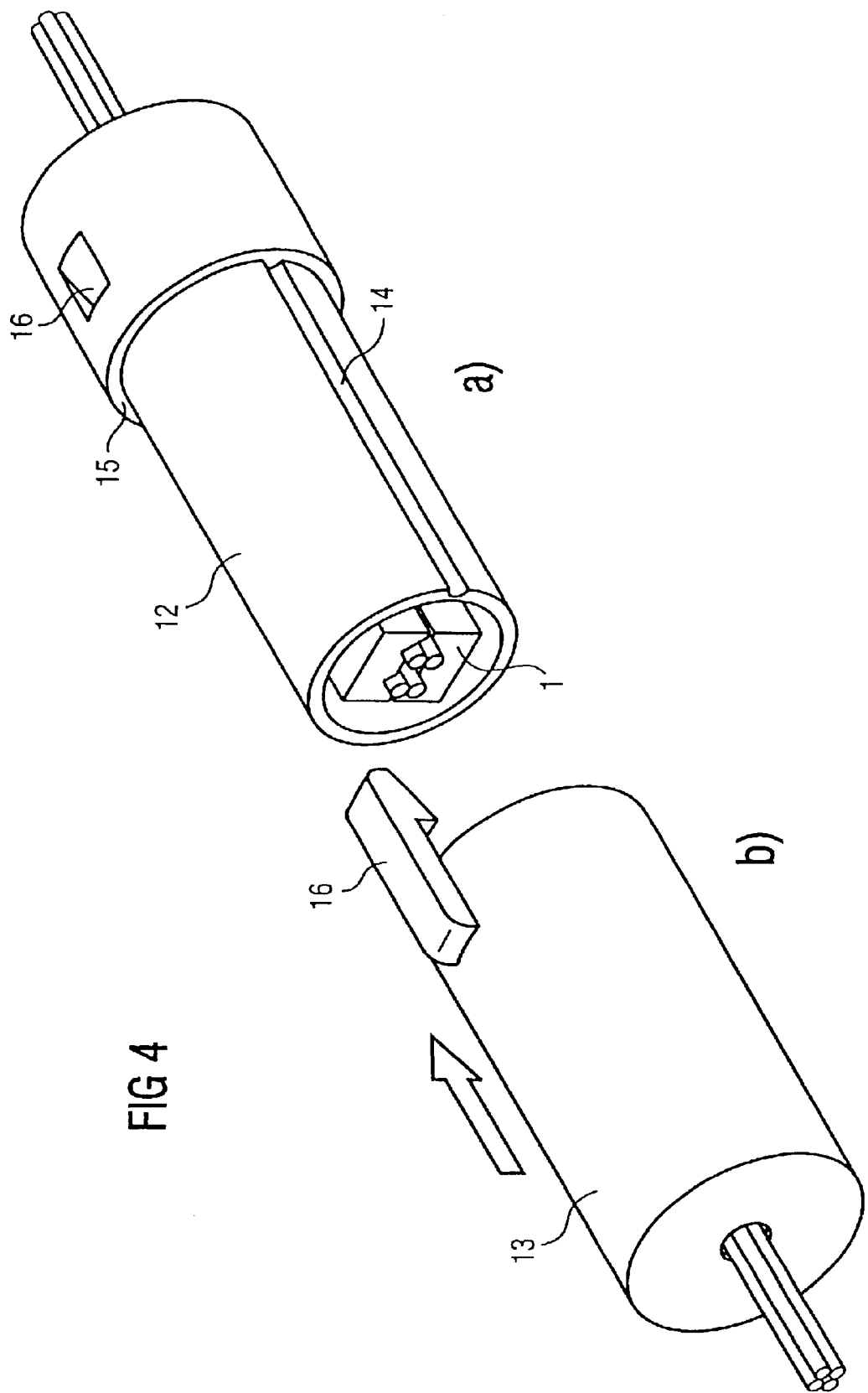
FIGS. 4A 4B show a plug housing.

FIGS. 4A and 4B illustrate connector sockets 12, 13 which ensure that the plug and counter plug unit will be reliably joined by insertion. FIG. 4A shows a cylindrically shaped connector female connector 12 provided with a guiding groove 14 and a seating ring 15. Inside the female connector 12 a plug unit 1 is centered which is adapted to be inserted into a mating counter plug unit 2 which is integrated in the female connector 13 in accordance with the embodiment shown in FIG. 4B. Both female connectors 12, 13 can be reliably connected to each other by means of a snap locking means 16.

The aforedescribed embodiment is restricted to the connection of two pairs of fibers each per plug and counter plug unit. This is particularly due to the shape of the grooves 62 within the adjusting portions but also to the geometric configuration of the connector in particular, which are provided with a cruciform cross-section. It goes without saying that plug/counter plug units are conceivable, too, which are adapted for being connected to each other by means of a connector having a cruciform cross-section and which make it possible to receive more than two pairs of fibers with an appropriate design of the support and adjusting portions.

What is claimed is:
1. An optical fiber connector having a plug unit and a counter plug unit, wherein said plug unit and said counter plug unit each comprise two components, each having a receiving portion for receiving and fixing at least two optical fibers and an adjusting portion having adjusters to adjust said optical fibers in a defined position, and wherein at least said adjusting portion provides for the insertion of a connector having at least two elongate V-shaped grooves, with one of said optical fibers being aligned by said adjusting portion in each of said grooves.

2. The optical fiber connector according to claim 1, wherein said receiving portion and said adjusting portion of said component are connected by an elongate joint which is stiff along its length and flexible with respect to torsion and/or bending.

3. The optical fiber connector according to claim 1, wherein said adjusters of said adjusting portion comprise at least two V-shaped grooves whereof each has two side flanks along which one of said optical fibers runs while being in loose contact with said side flanks.

4. The optical fiber connector according to claim 1, wherein said adjusting portion comprises a seating surface opposite to that side of said adjusting portion which is directed towards said receiving portion.

5. The optical fiber connector according to claim 4, wherein each of said optical fibers has a fiber end, with said optical fibers projecting by their fiber ends beyond said seating surface.

6. The optical fiber connector according claim 3, wherein said two V-shaped grooves of said adjusting portion together have a W-shaped cross-section.

7. The optical fiber connector according to claim 1, wherein said receiving portion comprises at least two grooves, with one optical fiber being insertable into and fixable in each of said grooves.

8. The optical fiber connector according to claim 7, wherein said optical fiber is fixable by adhesive or mechanical force.

9. The optical fiber connector according claim 7, wherein said receiving portion comprises two opposite sides, with said grooves being provided on side, said adjusting portion comprises also two opposite sides, with said adjusters being provided on one side thereof, and said side of said receiving portion comprises said grooves while said side of said adjusting portion comprises said adjusters which are turned away from each other.

10. The optical fiber connector according to claim 7, wherein said adjusters is provided with two V-shaped grooves spaced from each other by a first distance which is smaller than a second distance between said grooves which are spaced from each other by said second distance.

11. The optical fiber connector according to claim 7, wherein said receiving portion comprises two opposite sides, with said grooves being provided on said first side and with a recess being formed on said second side for insertion of said connector.

12. The optical fiber connector according to claim 1, wherein said two components are joined together by facing said adjusters of said adjusting portion of each component.

13. The optical fiber connector according to claim 12, wherein said receiving portions of both components are closely fixed to each other in a detachable or permanent manner.

14. The optical fiber connector according to claim 12, wherein said receiving portions of said components are joined and enclose a recess into which said connector is insertable.

15. The optical fiber connector according to claim 4, wherein said plug unit is a male plug and comprises said connector extending beyond said seating surface, and said counter plug unit is a female plug comprising said two components without said connector.

16. The optical fiber connector according to claim 1, wherein said connector resembles an elongate rod having a cruciform cross-section provided with four grooves either in circular arrangement around the rod or in a star arrangement provided with three, five or more grooves disposed in a circular arrangement around said rod.

17. The optical fiber connector according to claim 1, wherein said components are made of a synthetic material by a molding process.

18. The optical fiber connector according to claim 1, wherein said connector joins said plug unit and said counter plug unit by being adhesively fixed in said plug unit as well as in said counter plug unit.

19. The optical fiber connector according to claim 18, wherein said optical fibers are aligned in said grooves of said connector and are pressed against each other by their fiber ends while they are mainly supported by resilience originating from said optical fibers.

20. The optical fiber connector according to claim 1, wherein said components are made of one piece.

21. The optical fiber connector according to claim 1, wherein said components of said plug unit and said counter plug unit are adapted to be disposed in a side-by-side relation ship or to be stacked on top of each other so as to form a one-dimensional or two-dimensional array of optical fibers to be connected.

22. The optical connector according to claim 1, wherein a plurality of said components of said plug unit and said counter plug unit is combined in a side-by-side relationship.

23. The optical connector according to claim 1, wherein said two components are identical in shape.

24. The optical fiber connector according to claim 2, wherein said adjusters of said adjusting portion comprise at least two V-shaped grooves whereof each has two side flanks along which one of said optical fibers runs while being in loose contact with said side flanks.

25. A method of producing an optical fiber connector having a plug unit and a counter plug unit, wherein said plug unit and said counter plug unit each comprise two components, each having a receiving portion for receiving and fixing at least two optical fibers and an adjusting portion having adjusters to adjust said optical fibers in a defined position, and wherein at least said adjusting portion provides for the insertion of a connector having at least two elongate V-shaped grooves, with one of said optical fibers being aligned by said adjusting portion in each of said grooves, comprising the steps of: inserting said optical fibers into each separate component by inserting each of said optical fibers into said grooves of said receiving portion and into said groove of said adjusting portion such that the end of each inserted optical fiber extends beyond a seating surface of said adjusting portion; fixing each of said inserted optical fibers in said groove of said receiving portion; combining said two components facing each other with their optical fibers inserted into said groove; and polishing said seating surface together with the ends of said optical fibers which partially extend into said combined components.

26. A method according to claim 24, further comprises the steps of producing said components by a molding process and making said components from a synthetic material.

27. A method according to claim 25, wherein said fixing step of said optical fibers in said grooves of said receiving portion is achieved by adhesive.

* * * * *